J. HALEY.
Die for Welding Chain-Links.

No. 197,123.　　　　　Patented Nov. 13, 1877.

WITNESSES
J. Wm Garner
A. J. de Peyk

INVENTOR.
Jno. Haley
per
F. A. Lehmann, Atty.

UNITED STATES PATENT OFFICE.

JOHN HALEY, OF NEW BRIGHTON, PENNSYLVANIA.

IMPROVEMENT IN DIES FOR WELDING CHAIN-LINKS.

Specification forming part of Letters Patent No. 197,123, dated November 13, 1877; application filed June 30, 1877.

*To all whom it may concern:*

Be it known that I, JOHN HALEY, of New Brighton, in the county of Beaver and State of Pennsylvania, have invented certain new and useful Improvements in Chain-Link Welding-Dies; and I do hereby declare the following to be a full, clear, and exact description of the invention, such as will enable others skilled in the art to which it pertains to make and use it, reference being had to the accompanying drawing, which forms part of this specification.

My invention relates to an improvement in chain-link-welding dies; and it consists in the arrangement and combination of parts that will be more fully described hereinafter, whereby the links are welded together in a rapid, cheap, and effective manner.

$a$ represents the bottom die, which moves back and forth a suitable distance in the guides $g$. In the rear end of this die is made a slot, and passing down through the slot is a stationary-rod, $d$, which acts as a stop to limit the forward motion of the die as it is being pressed forward.

Figure 1:
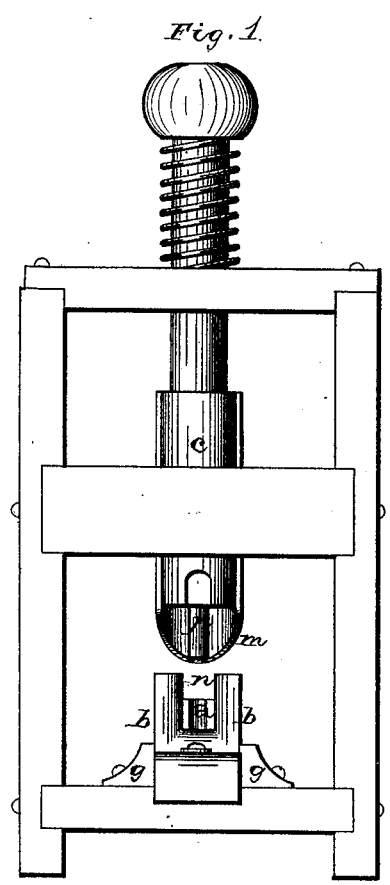
Figure 2:
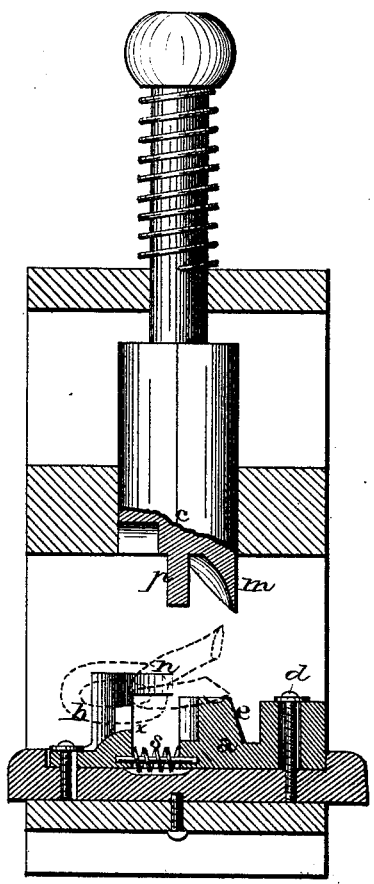
Figure 3:
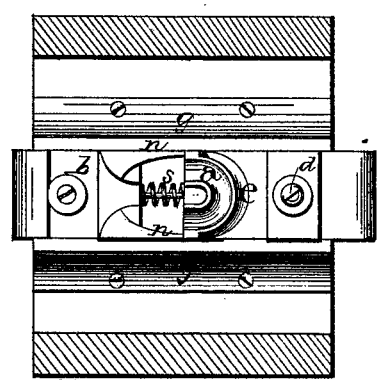

The rear portion of the die upon which the link to be welded is placed is inclined downward, as shown at $e$, Fig. 2, so that when the upper die descends upon it the die $a$ will be moved forward. Placed between this die $a$ and the check-die $b$ is the spring $s$, which moves the die back into position again after it has been forced forward. This spring may be dispensed with, and the die moved back by a tool in the workman's hand.

The check-die $b$ is rigidly secured to the bed-plate, and is provided with two arms, $n$, upon its inner corners, and which are raised high enough up to allow the front edge of the die $a$ to pass under them. The inner portion of the die $b$ is cut away, so as to form the shoulder $x$, and the space between the two arms $n$ serves to allow a link of the chain to pass between them, as shown in Fig. 2, while the arms act as a stop to the link that is being welded.

The upper die $c$ has a pin, $p$, projecting from its under side, and a lip, $m$, formed upon its rear edge. The lip presses down upon the inclined plane $e$, and forces the die forward at the same time that the pin passes down through the center of the link that is being welded into a hole in the center of the die $a$, so as to hold the link in position and prevent any lateral play of the die.

The cap $m$ occupies the rear half of the lower circumference of the upper die, increasing in depth from both sides toward the center, and when pressed down it nearly touches the bed-plate.

When the upper die descends, the inner slanting side of the lip $m$ is in contact with the slanting side of the lower die and pushes the matrix forward. This contact is continuous to the end, and the lip consequently forms a covering or shield over the point of contact of the two dies, whereby it prevents the formation of a fin when the welding occurs.

It will thus be seen that the lip $m$ performs two offices, one of which is to push the movable die $a$ forward, and the other to prevent a fin from forming on the end of the link.

The great difficulty found in making chain-links smooth and free from all superfluous material is entirely overcome by the use of the cap, which, not only in its downward course smooths the link, but prevents the formation of the fins and unevenness usually found on chain-links that are welded by dies.

Having thus described my invention, I claim—

1. The combination of the die $c$, having the lip $m$, with the die $a$, the lip forming a guard over the end of the link, to prevent the formation of a fin, substantially as shown.

2. The combination of the descending die $c$, the horizontally-moving die $a$, and the fixed die $b$, substantially as set forth.

3. The combination of the descending die $c$, a horizontally-moving die, $a$, that is moved forward by the lip $m$ on the die $c$, and the fixed die $b$, provided with the arms $n$, substantially as specified.

In testimony that I claim the foregoing I have hereunto set my hand this 23d day of June, 1877.

JOHN HALEY.

Witnesses:
T. F. LEHMANN,
JOHN R. MILLER.